(No Model.)
G. L. ANDERS.
Telephone Transmission.
No. 231,466.                    Patented Aug. 24, 1880.
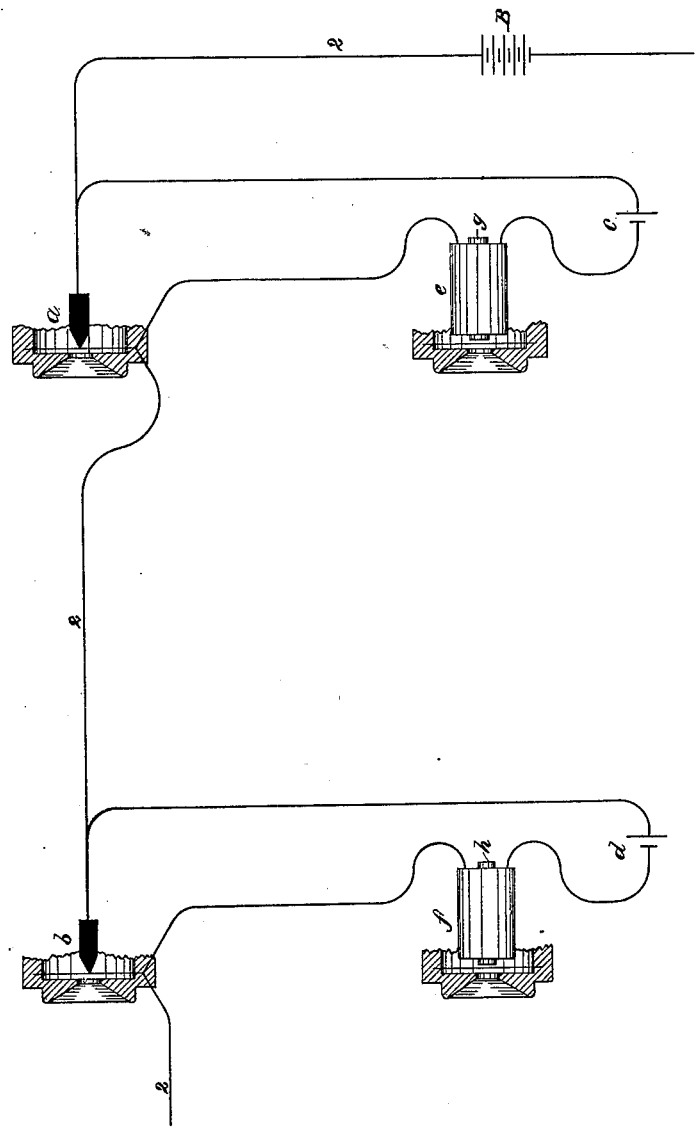
WITNESSES
Jos. P. Livermore
L. F. Connor
INVENTOR
George L. Anders
by Crosby & Gregory
Attys.

United States Patent Office.

GEORGE L. ANDERS, OF BOSTON, MASSACHUSETTS.

TELEPHONE-TRANSMISSION.

SPECIFICATION forming part of Letters Patent No. 231,466, dated August 24, 1880.

Application filed April 12, 1880. (No model.)

*To all whom it may concern:*

Be it known that I, GEORGE L. ANDERS, of Boston, county of Suffolk, State of Massachusetts, have invented an Improvement in Telephone-Transmission, of which the following description, in connection with the accompanying drawing, is a specification.

My invention relates to telephone-transmission, and has for its object to reduce or remove the detrimental effects of induction in contiguous lines. In connection with the arrangement of circuits and means for generating and controlling the currents therein for attaining this object, I intend also to employ a novel form of receiving-telephone instrument in which the permanent magnet of the usual telephone is replaced by an electro-magnet in a local circuit. The local battery and induction-coil now commonly used in connection with the microphone-transmitters, which produce induction-currents of great tension in the main lines, are dispensed with, the local circuit passing through the coils of the electro-magnet of the receiving-instrument just described, also passing through the microphone-transmitter, and being a branch of a main-line circuit passing through the said transmitter, and provided with a battery the current of which is intended to take the place of the induced currents of the apparatus now in use.

The local branch circuit joins the main circuit on each side of the mircophone-transmitter, and its battery is placed so that its current flows through the said transmitter in the same direction as the main current, the result of such arrangement being that when the resistance to the main current is increased at the transmitter the resistance of the local current is also increased at that point, and consequently a larger portion of the said local current passes to the main line in a direction to oppose and thus further diminish the strength of the main current, and similarly when the resistance at the transmitter is diminished the opposition of the local to the main current is thereby also diminished. The inductive influence of the coil of the electro-magnet of the receiving-instrument before described will also be of the proper nature to add to the intensity of the fluctuations of the main current, which will thus be suitable for telephone-transmission without, however, having the high tension, and consequently strong inductive influence, of the currents derived from the apparatus now commonly used.

It will be readily understood that receiving-telephones of the usual form might also be used in connection with the arrangement shown for transmitting, the essential feature of the invention being the substitution of battery-currents for induced currents and the arrangement of the local circuit as branches or shunts of the main circuit, as described.

The drawing shows two stations on a main-line circuit provided with instruments and the arrangement thereof for telephonic communication embodying my invention.

The main line 2, including a battery, B, of the proper strength, passes through the usual microphone-transmitters $a$ $b$, so that the variations in resistance of the said transmitters produce fluctuations in the current in the said main current. At each station local batteries $c$ $d$ are placed in branch circuits joining the main line 2, one each side of the transmitters $a$ $b$, the said batteries being placed with the same pole toward the carbon of the transmitters as that of the main battery B.

The circuit of the local batteries $c$ $d$ passes through coils $e f$, wound upon soft-iron cores $g$ $h$, thus forming electro-magnets thereof, which are provided with the usual diaphragms to enable them to be used for telephonic communication.

If the transmitter $a$ is used to transmit a message, it will be seen that an increased resistance in the carbon, besides its direct effect on the main-line current, will also cause a larger portion of the current of the local battery $c$ to pass to the main line in the direction to oppose and further weaken the current therein, while a decrease in resistance in said carbon will have the contrary effect, the variations in resistance thus causing large fluctuations in the current, which, passing through the coils $f$ of the receiving-instruments in the various branch circuits, will strongly affect the cores $h$ thereof, and consequently the diaphragms.

In order to attain the best effects in this system, the main circuit and the normal condition of the various instruments should be of low resistance.

I claim—

1. That improvement in the art or method of telephonic communication which consists in passing a main-battery circuit through transmitting-instruments adapted to cause variations in the resistance of the said circuit, and in locating receiving-instruments in branches connected with the said main circuit on opposite sides of a suitable resistance, substantially as described.

2. In a telephonic transmission apparatus, a main-battery circuit and a transmitting-instrument therein adapted to cause variations in the resistance of said circuit, in combination with a local-battery circuit connected on opposite sides of the transmitting-instrument, so that the local-battery current passes through the transmitting-instrument in the same direction as that of the main battery, as and for the purpose described.

3. The herein-described receiving-telephone apparatus, consisting of a coil wound on a soft-iron core provided with the usual diaphragm, and a battery placed in a local circuit passing through the said coil, and being a branch or shunt of the main-line circuit, connected on opposite sides of a suitable resistance, substantially as described.

4. An electrical system comprising a main circuit with resistance-transmitters therein and branches with receiving-instruments and batteries therein, connected with the main circuit on opposite sides of said transmitters, substantially as described.

In testimony whereof I have signed my name to this specification in the presence of two subscribing witnesses.

GEORGE LEE ANDERS.

Witnesses:
JOS. P. LIVERMORE,
ARTHUR REYNOLDS.